United States Patent [19]

Ambille et al.

[11] 4,343,298
[45] Aug. 10, 1982

[54] COLLECTOR FOR SOLAR BOILER WITH LINEAR CONCENTRATION

[75] Inventors: Georges Ambille, Andernos; Eugene Bacconnet, Marcoussis; Philippe Ragot, Suresnes, all of France

[73] Assignee: Commissariat a l'Energie Atomique, Paris, France

[21] Appl. No.: 151,912

[22] Filed: May 21, 1980

[30] Foreign Application Priority Data

May 28, 1979 [FR] France ................................ 79 13471

[51] Int. Cl.³ ................................................ F24J 3/02
[52] U.S. Cl. ..................................... 126/450; 126/438; 126/439; 126/451; 126/417; 138/113; 138/114
[58] Field of Search ............... 126/450, 438, 439, 417, 126/451; 138/108, 113, 114

[56] References Cited

U.S. PATENT DOCUMENTS

| 1,068,650 | 7/1913 | Harrison | 126/443 X |
|---|---|---|---|
| 2,475,544 | 7/1949 | Cueto | 126/443 |
| 2,875,987 | 3/1959 | LaValley | 138/114 X |
| 3,227,153 | 1/1966 | Godel et al. | 126/443 |
| 3,694,914 | 10/1972 | Aupoix et al. | 138/113 X |
| 4,078,549 | 3/1978 | McKeen et al. | 126/438 X |
| 4,088,120 | 5/1978 | Anderson | 126/425 |
| 4,122,832 | 10/1978 | Hirschsohn et al. | 126/443 |
| 4,124,019 | 11/1978 | Heffelfinger | 126/443 |
| 4,220,140 | 9/1980 | Francia | 126/438 X |
| 4,250,927 | 2/1981 | Newburg | 138/113 |

Primary Examiner—Larry Jones
Attorney, Agent, or Firm—Pearne, Gordon, Sessions, McCoy & Granger

[57] ABSTRACT

In a collector for solar boiler with linear concentration, comprising a pick-up tube through which a heat-transfer fluid passes and disposed in a supporting structure, said supporting structure is constituted by a section in omega form, with a wide opening at its base, this section being provided with an inner reinforcement, and the pick-up tube is held by rigid crosspieces made of insulating material, distributed along the section and fixed to the base of the omega.

4 Claims, 1 Drawing Figure

U.S. Patent        Aug. 10, 1982        4,343,298
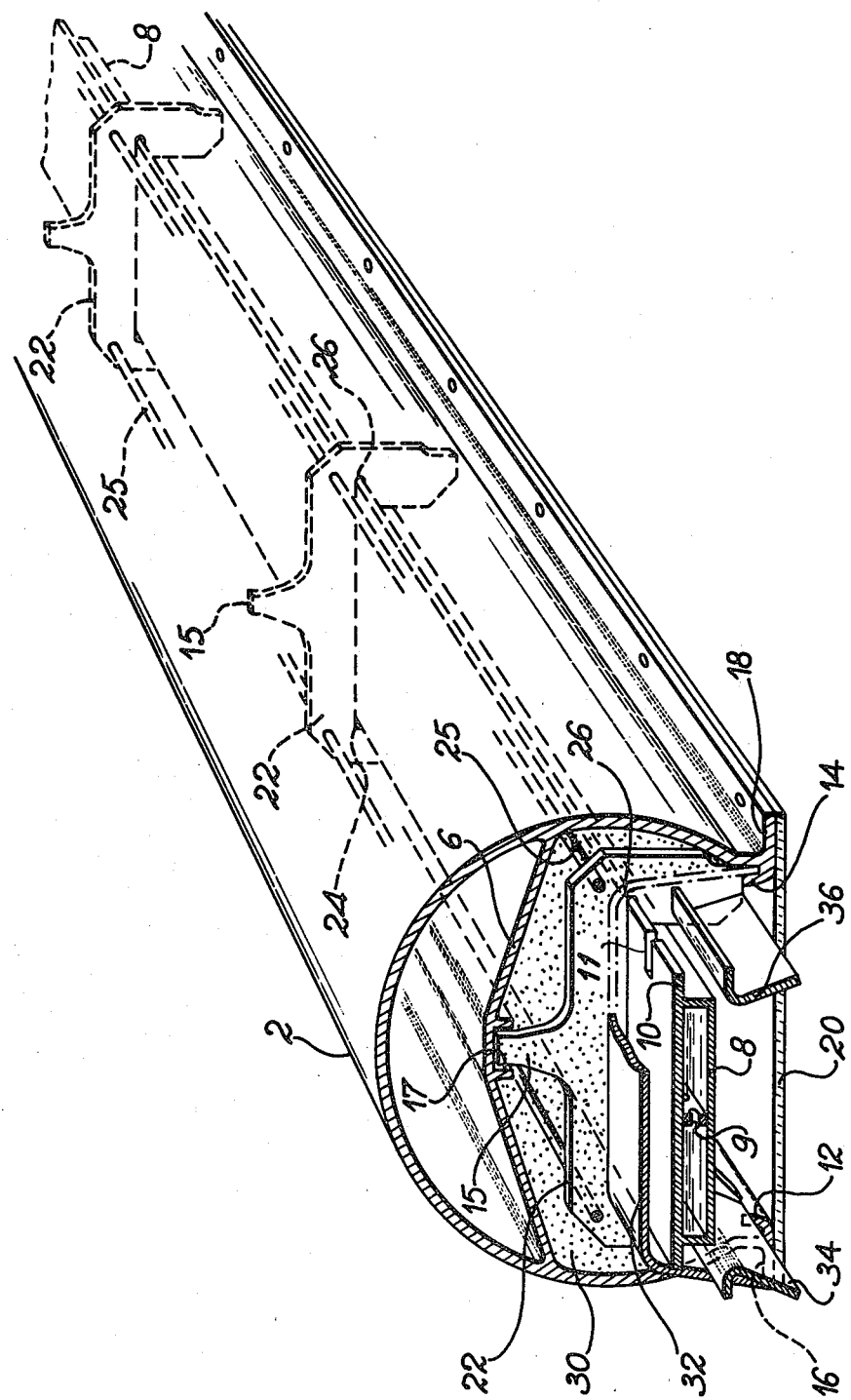

COLLECTOR FOR SOLAR BOILER WITH LINEAR CONCENTRATION

The present invention relates to a collector for solar boiler with linear concentration.

This type of solar boiler is constituted by an assembly of flat mirrors disposed along the generatrices of a cylinder, these mirrors being oriented such that the sun's rays which they reflect are focused on the same line merged with a genetratrix of the cylinder, and by a collector of linear form disposed along this focus line.

The mirrors are generally fixed and the line where the reflected rays are focused moves over the cylinder when the position of the sun varies. To ensure that the device is constantly efficient, whatever the position of the sun, the collector must be movable and follow the displacement of the focus line. To this end, the collector is fixed, by its two ends, to two rotating arms animated by the appropriate movement of rotation.

Such an installation is described in particular in U.S. Pat. No. 3,868,823 of Mar. 4, 1975 entitled "Concentrator, Method and System for utilizing radiant energy", in the report GA-A 14883 by J. R. SCHUSTER et al, published in March 1978 by "General Atomic Company", and entitled "Fixed mirror solar concentration for power generation", in French Patent Application No. 2,372,400 filed on Nov. 30, 1977, and in U.S. Pat. No. 4,022,184 granted May 10, 1977.

The drawback of the collectors of the prior art is that they are fairly complex, and it is an object of the present invention to reduce this complexity. To this end, the thermal insulation used in the collector is given an additional function, that of supporting the pick-up tube; in addition, the supporting structure is constituted by an omega section which is sufficiently rigid to be able to be suspended at its ends from the rotary arms.

More precisely, the present invention relates to a collector for solar boiler with linear concentration, comprising a pick-up tube through which a heat-transfer fluid passes and disposed in a supporting structure, wherein the supporting structure is constituted by a section in omega form with a wide opening at the base, this section being provided with an inner reinforcement, and the pick-up tube is held by rigid crosspieces made of insulating material, distributed along the section and fixed to the base of the omega.

The invention will be more readily understood on reading the following description with reference to the accompanying drawings, in which:

The single FIGURE shows an embodiment of the invention in transverse section.

The collector shown in the FIGURE comprises a section 2 for example made of light alloy, in omega form, with a wide opening at the base; this section is provided with an inner reinforcement 6 disposed between the axis and circular portion of the omega. In its lower part, the section comprises two oblique, inwardly directed flanges 12 and 14 and two outwardly directed flanges 16 and 18 allowing fixation of a pane of glass 20.

Rigid crosspieces 22 (for example made of ceramics) are distributed at regular intervals and supported by the flanges 12 and 14 of the section. These crosspieces may be maintained in position by rods 25 and by a lug 15 fitting in a groove 17 provided in the reinforcement 6. Slots 24 and 26 are machined in these crosspieces, in which a metal sheet 10 supporting a pick-up tube 8 is fitted. The space between the reinforcement 6, the section 2, the pick-up tube 8 and the crosspieces 22 is filled with a fibrous insulating material 30 (for example of the rock wool type) held in position by insulating sheets 32 placed in the gaps between crosspieces.

The pick-up tube comprises one or more inner cross pieces such as 9 extending over the whole length of the tube and which enable it to withstand without deformation the internal pressure due to the heat-transfer fluid in the tube. The crosspieces comprise spaced apart holes allowing the heat transfer fluid circulating on either side of the crosspiece to be mixed.

Flat mirrors 34 and 36 are fixed to the lower part of the section of the insulating material. These mirrors touch neither the tube nor the section. They serve mainly to protect the insulating material and to reduce the optical losses. They may be made of highly polished aluminium, silver-plated glass, etc.

It is advantageous to machine notches 11 in the metal sheet 10 which are slightly wider than the crosspieces 22, this facilitating the assembly of the pick-up tube through the base of the omega, instead of proceeding by introduction of the tube through one of the side ends. The metal sheet 10 may also be replaced by regularly spaced apart tabs.

The arrangement according to the invention, due to the existence of the rigid section, also promotes the fixation of the whole on the rotating arms giving the collector the appropriate movement of rotation. In fact, it is the section which may be fixed to these arms, and not the pick-up tube, as in the prior art (cf. Patent Application French Pat. No. 2,372,400 mentioned hereinabove), this largely solving the problems of connection.

The section described has a shape which gives it a moment of inertia capable of limiting the camber of the collector between its different points of support, which may be spaced apart by several meters. This camber must be small in order to avoid the tube, in which the heat-transfer fluid circulates, from moving too far from the generatrix of the cylinder corresponding to the focus line of the concentrator with segmented mirrors.

By way of example, Applicant has successfully produced a collector of the type described, employing a section of 180 mm diameter, opening 136 mm, 6 m long and 2.8 mm thick; the inner reinforcement had a thickness of 2.8 mm. For a boiler 48 m long, the collector comprised eight identical modular elements in alignment. The pick-up tube was a rectangular steel tube measuring 100×10 mm and 6 m long. It was connected at its ends to cylindrical inlet-outlet tubes of 30 mm diameter themselves fast with expansion elements.

The pressure of the heat-transfer fluid in this tube is between 2 and 4 bars. A calculation of the camber f taken at its centre by a collector module of 6 m gives for the following two cases:

1-plane of horizontal opening: f=8 mm
2-plane of vertical opening: f=3 mm.

These results have been confirmed by experience. In case (1), the camber has little influence on the quality of the collector. On the other hand, in case (2), the camber must be as little as possible; in this case, a very good result was obtained due to the form given to the section and a judicious positioning of the inner reinforcement.

From this description, the collector of the invention will be seen to offer several advantages over the systems of the prior art:

(1) It does not comprise a reconcentrator, hence the optical yield is improved by elimination of the losses in the reconcentrator.

(2) The pick-up tube is supported by the heat insulating material; this avoids any thermal contact between the pick-up and the structure, hence the losses by thermal bridge are eliminated.

(3) The supporting structure in section presents the following advantages:

(a) It is simple and inexpensive;

(b) It employs a mastered technique, that of boat masts;

(c) Its mechanical characteristics are advantageous; the section is studied to present a moment of inertia such that the camber of the 6 m module is no more than 3 mm, whilst providing a sufficient space inside to position the pick-up tube with good heat insulation.

(d) The pick-up tube is protected since it is confined in an enclosed space.

(e) This enclosed space is of reduced dimensions; hence a reduction in the shadows made by the collector on the mirror unit.

What is claimed is:

1. In a collector for solar boiler with linear concentration, comprising a pick-up tube through which a heat-transfer fluid passes and disposed in a supporting structure, said supporting structure is constituted by a section in omega form, with a wide opening at its base, this section being provided with an inner reinforcement, and the pick-up tube is held by rigid crosspieces made of insulating material, distributed along the section and fixed to the base of the omega.

2. The collector of claim 1, wherein the crosspieces are pierced with slots, and the pick-up tube is provided with a metal sheet engaging in said slots.

3. The collector of claim 1, wherein the space between the reinforcement, the section, the pick-yp tube and the crosspieces is filled with a heat insulating material maintained in position by sheets of heat insulating material placed in the gaps separating the crosspieces.

4. The collector of claim 1, wherein it comprises two flat mirrors disposed at the base of the section.

* * * * *